(12) United States Patent
Xu et al.

(10) Patent No.: US 11,115,871 B2
(45) Date of Patent: Sep. 7, 2021

(54) DATA DISTRIBUTION METHOD, APPARATUS, AND SYSTEM

(71) Applicant: HUAWEI TECHNOLOGIES CO., LTD., Guangdong (CN)

(72) Inventors: Qing Xu, Shanghai (CN); Youyang Yu, Shanghai (CN); Han Zhou, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 101 days.

(21) Appl. No.: 16/684,047

(22) Filed: Nov. 14, 2019

(65) Prior Publication Data

US 2020/0084671 A1 Mar. 12, 2020

Related U.S. Application Data

(63) Continuation of application No. PCT/CN2017/085361, filed on May 22, 2017.

(51) Int. Cl.
*H04W 28/24* (2009.01)
*H04W 28/02* (2009.01)
(Continued)

(52) U.S. Cl.
CPC ....... *H04W 28/24* (2013.01); *H04W 28/0268* (2013.01); *H04W 48/06* (2013.01); *H04W 48/16* (2013.01); *H04W 80/10* (2013.01)

(58) Field of Classification Search
CPC . H04W 28/24; H04W 28/0268; H04W 48/06; H04W 48/16; H04W 80/10
(Continued)

(56) References Cited

U.S. PATENT DOCUMENTS

| 8,111,714 | B2* | 2/2012 | Melsen | H04L 47/70 370/468 |
| 2002/0075819 | A1 | 6/2002 | Kumar et al. | |
| 2011/0164527 | A1* | 7/2011 | Mishra | H04L 45/123 370/252 |

(Continued)

FOREIGN PATENT DOCUMENTS

| CN | 101127691 A | 2/2008 |
| CN | 102752716 A | 10/2012 |

(Continued)

OTHER PUBLICATIONS

Office Action issued in Chinese Application No. 201780089670.7 dated Apr. 1, 2020, 18 pages (with English Translation).

(Continued)

*Primary Examiner* — Nghi H Ly
(74) *Attorney, Agent, or Firm* — Fish & Richardson P.C.

(57) ABSTRACT

The present disclosure relates to data distribution methods. One example method includes receiving an access policy, where the access policy includes flow description information, quality information of at least two links, and a data distribution policy on the at least two links, receiving a service data flow, and in response to determining that the access policy includes flow description information of the service data flow, determining link quality information of a link used for transmitting the service data flow, and distributing the service data on the link according to the data distribution policy, where the data distribution policy is a data distribution policy that is determined based on the access policy and that is corresponding to the link quality information and the flow description information of the service data flow.

20 Claims, 9 Drawing Sheets

(51) Int. Cl.
*H04W 48/06* (2009.01)
*H04W 48/16* (2009.01)
*H04W 80/10* (2009.01)

(58) Field of Classification Search
USPC .............. 370/329, 328, 338, 341, 345, 350
See application file for complete search history.

(56) References Cited

U.S. PATENT DOCUMENTS

| | | |
|---|---|---|
| 2014/0254498 A1 | 9/2014 | Mueck et al. |
| 2015/0350989 A1 | 12/2015 | Himayat et al. |
| 2016/0174107 A1 | 6/2016 | Kanugovi et al. |
| 2016/0255542 A1* | 9/2016 | Hughes ................ H04W 28/18 370/329 |
| 2016/0278139 A1 | 9/2016 | Lei et al. |
| 2019/0150176 A1* | 5/2019 | Pelletier ............ H04W 72/1247 370/329 |

FOREIGN PATENT DOCUMENTS

| | | | |
|---|---|---|---|
| CN | 103873479 A | | 6/2014 |
| CN | 103987088 A | | 8/2014 |
| CN | 105450536 A | | 3/2016 |
| CN | 106465179 A | | 2/2017 |
| EP | 2645785 A1 | | 10/2013 |
| EP | 3104662 A1 | | 12/2016 |
| JP | 2013027042 A | | 2/2013 |
| WO | 2016092356 A1 | | 6/2016 |

OTHER PUBLICATIONS

Huawei, HiSilicon, "Remaining issues on uplink transmission for eLWA," 3GPP TSG-RAN WG2 Meeting #97, R2-1701250, Athens, Greece, Feb. 13-17, 2017, 6 pages.
Office Action issued in Japanese Application No. 2019-5644001 dated Nov. 4, 2020, 6 pages (with English translation).
Extended European Search Report issued in European Application No. 17910522.6 dated Jan. 10, 2020, 8 pages.
PCT International Search Report and Written Opinion issued in International Application No. PCT/CN2017/085361 dated Feb. 22, 2018, 16 pages (with English translation).
EPO Communication pursuant to Article 94(3) EPC on European Application No. 17910522.6 dated Feb. 22, 2021, 4 pages.

* cited by examiner

DATA DISTRIBUTION METHOD, APPARATUS, AND SYSTEM

CROSS-REFERENCE TO RELATED APPLICATIONS

This application is a continuation of International Application No. PCT/CN2017/085361, filed on May 22, 2017, the disclosure of which is hereby incorporated by reference in its entirety.

TECHNICAL FIELD

This application relates to the field of communications technologies, and in particular, to a data distribution method, apparatus, and system.

BACKGROUND

To meet a challenge brought by a mobile broadband (MBB) technology and maintain a leading edge of a 3rd Generation Partnership Project (3GPP for short) network, a 3GPP standard group formulated a next-generation mobile communications network architecture at the end of 2016, which is referred to as a fifth generation (5G) network architecture. The 5G network architecture supports not only access to a core network (5G Core network) by using a radio technology (for example, long term evolution (LTE) and a 5G radio access network (RAN)) defined by a 3GPP standard group, but also access to a core network by using a non-3rd Generation Partnership Project (Non-3GPP) access technology through a non-3GPP access gateway.

In addition, increasing terminal devices already support or will support different types (for example, 3GPP and Non-3GPP) of network access technologies. Therefore, corresponding to these terminal devices with a plurality of access capabilities, enabling these terminal devices to simultaneously access a 5G core network by using a plurality of access technologies and to distribute data on different access links for increasing access bandwidth of a user and improving quality of experience (QoE) of the user is a highly important and essential technical subject.

SUMMARY

Embodiments of the present invention provide a data distribution method, apparatus, and system, to send data by using a plurality of links in a multi-link case.

To achieve the foregoing objective, the embodiments of the present invention provide the following technical solutions:

According to a first aspect, an embodiment of the present invention provides a data distribution method. The method includes: first receiving, by a communications device, an access policy from a session management function entity, where the access policy includes flow description information of a service data flow, quality information of at least two links, and a data distribution policy of the data flow on the links; then receiving, by the communications device, a service data flow, and if the access policy includes flow description information of the service data flow, determining, by the communications device, link quality information of a link used for transmitting the service data flow; and distributing the service data on the link according to the data distribution policy, where the data distribution policy is a data distribution policy that is determined based on the access policy and that is corresponding to the link quality information and the flow description information of the service data flow. By using the foregoing method, in a process of determining the data distribution policy, because the quality information of the at least two links is obtained, a policy of distributing data on different links may be determined based on a quality difference between the different links, thereby ensuring effective utilization of bandwidth on each link, and increasing a data transmission rate.

In specific implementation, the communications device may be user equipment or a user plane function entity, or certainly may be another device.

In a possible design, the data distribution policy includes a distribution ratio of the data flow on the links; and correspondingly, the distributing, by the communications device, the service data flow on the link according to the data distribution policy specifically includes: sending, by the communications device based on the distribution ratio of the data flow on the links, the service data on the corresponding link at the corresponding distribution ratio.

In another possible design, the data distribution policy further includes a waiting latency used by a receiving party to perform data reordering.

In another possible design, the data distribution policy further includes a data sending sequence.

In another possible design, the service data further includes a data packet sequence number, and the sequence number is used by the receiving party to reorder received service data based on the sequence number.

In another possible design, the method further includes: receiving, by the communications device, an updated access policy from the session management function entity.

In another possible design, before the distributing, by the communications device, the service data on the link according to the data distribution policy, the method further includes: determining, by the communications device based on the access policy, a data distribution policy corresponding to the link quality information and the flow description information of the service data flow.

In another possible design, if the communications device is a user plane function entity, the communications device may determine the link quality information by using one of the following several methods:

sending, by the communications device, a link detection request message to user equipment, and receiving link quality information from the user equipment, where the link quality information is used to indicate a current status of the link; or selecting, by the communications device, detected link quality information on the user plane function entity as current link quality; or analyzing, by the communications device, another service data flow on the user plane function entity to determine current link quality information.

In another possible design, if the communications device is user equipment, the communications device may determine the link quality information by using one of the following several methods:

sending, by the communications device, a link detection request message to a user plane function entity, and receiving link quality information from the user plane function entity, where the link quality information is used to indicate a current status of a link; or selecting, by the communications device, detected link quality on the user equipment as current link quality information; or analyzing, by the communications device, another service data flow on the user equipment to determine current link quality information.

According to a second aspect, an embodiment of the present invention provides another data distribution method, and the method includes: first receiving, by a communications device, a reporting rule from a session management function entity, where the reporting rule is used to instruct the communications device to report, when receiving a newly established service data flow of a first service type, flow description information of the service data flow and link quality information of a link used for transmitting the service data flow, and the service data flow of the first service type is a service data flow that supports multi-access transmission; receiving, by the communications device, a service data flow of the first service type, and determining, by the communications device, first link quality information of a link used for transmitting the service data flow; then sending, by the communications device, the first link quality information and flow description information of the service data flow to the session management function entity; receiving, by the communications device, a data distribution policy from the session management function entity; and distributing, by the communications device, the service data on the link according to the data distribution policy, where the data distribution policy is a data distribution policy that is determined based on an access policy and that is corresponding to the first link quality information and the flow description information of the service data flow, and the access policy includes flow description information of a data flow, quality information of at least two links, and a data distribution policy of the data flow on the links. By using the foregoing method, in a process of determining the data distribution policy, because the quality information of the at least two links is obtained, a policy of distributing data on different links may be determined based on a quality difference between the different links, thereby ensuring effective utilization of bandwidth on each link, and increasing a data transmission rate.

In specific implementation, the communications device may be user equipment or a user plane function entity, or certainly may be another device.

In a possible design, the reporting rule is further used to instruct the communications device to report, when link quality of the link used for transmitting the service data flow changes, second link quality information of the link used for transmitting the service data flow; and the second link quality information is changed link quality information of the link used for transmitting the service data flow; and correspondingly, the method further includes: determining, by the communications device, the second link quality information of the link used for transmitting the service data flow, and if the second link quality information is different from the first link quality information, sending, by the communications device, the second link quality information to the session management function entity.

In another possible design, the method further includes: receiving, by the communications device, an updated data distribution policy from the session management function entity; and then distributing, by the communications device, the service data on the link according to the updated data distribution policy, where the updated data distribution policy is a data distribution policy that is determined based on the access policy and that is corresponding to the second link quality information and the flow description information of the service data flow.

According to a third aspect, an embodiment of the present invention provides a data distribution system, including the user plane function entity and the session management function entity in the second aspect.

According to a fourth aspect, an embodiment of the present invention provides another data distribution method, and the method includes: first receiving, by a communications device, a reporting rule from a session management function entity, where the reporting rule is used to instruct the communications device to report, when link quality of a link used for transmitting a service data flow of a first service type changes, updated link quality information of the link used for transmitting the service data flow; then receiving, by the communications device, a service data flow of the first service type, and determining updated link quality information of a link used for transmitting the service data flow; if the updated link quality information is different from reported link quality information of the link used for transmitting the service data flow, sending, by the communications device, the updated link quality information to the session management function entity; and subsequently receiving, by the communications device, a data distribution policy from the session management function entity, and distributing the service data on the link according to the data distribution policy, where the data distribution policy is a data distribution policy that is determined based on an access policy and that is corresponding to the updated link quality information and flow description information of the service data flow; and the access policy includes flow description information of a data flow, quality information of at least two links, and a data distribution policy of the data flow on the links. By using the foregoing method, the updated link quality information may be obtained in time, to determine a new data distribution policy for different links based on the updated link quality information, thereby ensuring effective utilization of bandwidth on each link, and increasing a data transmission rate.

In specific implementation, the communications device may be user equipment or a user plane function entity, or certainly may be another device.

In a possible design, the data distribution policy includes a distribution ratio of the data flow on the links; and correspondingly, the distributing, by the communications device, the service data flow on the link according to the data distribution policy specifically includes: sending, by the communications device based on the distribution ratio of the data flow on the links, the service data on the corresponding link at the corresponding distribution ratio.

In a possible design, that the updated link quality information is different from reported link quality information of the link used for transmitting the service data flow may be specifically: an amount of a change between the updated link quality information and the reported link quality information of the link used for transmitting the service data flow exceeds a predetermined threshold.

According to a fifth aspect, an embodiment of the present invention provides a communications device, and the communications device has a function of an execution body that implements the method embodiment according to any possible design of the first aspect, the second aspect, or the fourth aspect. The function may be implemented by hardware, or may be implemented by hardware by executing corresponding software. The hardware or software includes one or more modules corresponding to the foregoing function.

According to a sixth aspect, an embodiment of the present invention provides another communications device, including a processor, a memory, a bus, and a communications interface. The memory is configured to store a computer executable instruction. The processor is connected to the memory by using the bus. When the device runs, the processor executes the computer executable instruction stored in the memory, so that the communications device performs the data distribution method according to any possible design of the first aspect, the second aspect, or the fourth aspect.

According to a seventh aspect, an embodiment of the present invention provides a computer program product including an instruction, and when the computer program product runs on a computer, the computer is enabled to perform the methods in the foregoing aspects.

According to an eighth aspect, an embodiment of the present invention provides a computer storage medium, including an instruction, and when the instruction runs on a computer, the computer is enabled to perform the methods in the foregoing aspects.

These aspects or other aspects of this application are clearer and more comprehensible in descriptions of the following embodiments.

DESCRIPTION OF EMBODIMENTS

Figure 1:
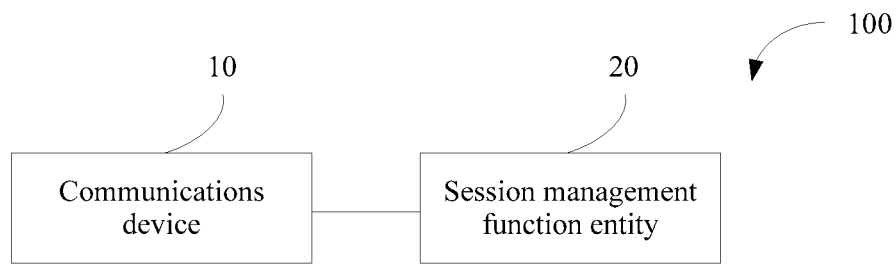
FIG. 1 is a schematic diagram of a possible system network according to an embodiment of the present invention.

To make the objectives, technical solutions, and advantages of this application clearer, the following further describes this application in detail with reference to the accompanying drawings. A specific operation method in a method embodiment may also be applied to an apparatus embodiment or a system embodiment.

A network architecture and a service scenario described in the embodiments of the present invention are intended to describe the technical solutions in the embodiments of the present invention more clearly, and do not constitute a limitation on the technical solutions provided in the embodiments of the present invention. A person of ordinary skill in the art may know that: With the evolution of the network architecture and the emergence of new service scenarios, the technical solutions provided in the embodiments of the present invention are also applicable to similar technical problems.

An embodiment of the present invention provides a data distribution system 100. The system 100 includes a communications device 10 and a session management function entity 20.

In first specific implementation, the communications device 10 first receives an access policy from the session management function entity 20, where the access policy includes flow description information of a data flow, quality information of at least two links, and a data distribution policy of the data flow on the links. The communications device 10 receives a service data flow. If the access policy received by the communications device 10 includes flow description information of the service data flow, the communications device 10 determines link quality information of a link used for transmitting the service data flow. Then, the communications device 10 distributes, on the link according to the data distribution policy, service data received by the communications device 10, where the data distribution policy is a data distribution policy that is determined based on the access policy and that is corresponding to the foregoing link quality information and the flow description information of the service data flow. The access policy may also be referred to as a multi-access (MA) policy, or may be referred to as another policy. A name does not constitute a limitation on the access policy. For simplicity of description, an example in which the access policy is an MA policy is used for description in some embodiments below.

Service data can be sent on a plurality of links through interaction between network elements in the system. In addition, in a process of determining the data distribution policy, because the quality information of the at least two links is obtained, a policy of distributing data on different links may be determined based on a quality difference between the different links, thereby ensuring effective utilization of bandwidth on each link, and increasing a data transmission rate.

Specifically, the flow description information includes a service type, and may further include 5-tuple information and the like. The service type is a type representing service data, for example, web page accessing (or browsing), video watching, gaming, an augmented reality (AR) video watching service, an internet of things (IOT) service, and the like.

A link is a transmission link corresponding to a multi-access technology. Quality information of a link may be bandwidth of the link, a latency of the link, a packet loss rate of the link, or a buffer occupation rate of the link, and certainly, no limitation is set thereto. The quality information may alternatively be other information that can reflect link quality in the prior art. The quality information of the link is used to indicate a current status of the link.

The multi-access technology may be a 3GPP access technology or a non-3GPP access technology, or may be another access technology. This is not limited in this application. The 3GPP access technology may be 4th generation (4G) access, 5G access, or another 3GPP access technology. The non-3GPP access technology may be wireless fidelity (wife) access, wireless local area network (WLAN) access, or another non-3GPP access technology. This is not limited in this application.

The MA policy represents a data distribution policy (or a data distribution scheme) of distributing different service data on different links. The data distribution policy may be understood as a policy in which data is split (for example, split) into data to be sent on different links, and then the data is sent. The data distribution policy may include a distribution ratio of a data flow on a link, may further include a waiting latency for a data receiving party to perform data reordering, and may further include a data sending sequence, and certainly, no limitation is set thereto. The data distribution policy may also include another data-distribution-related policy. This is not limited in this application. The waiting latency is used on a data receiving side to wait for out-of-order data packets, to reduce disorder and a pseudo packet loss that are caused by multi-path concurrency, thereby improving user experience.

In the first specific implementation, the communications device may be specifically a user plane function entity. In a scenario in which the communications device is a user plane function entity, a method for determining the data distribution policy is as follows: After determining the link quality information of the link used for transmitting the service data flow, the communications device 10 determines, based on the access policy, a data distribution policy corresponding to the link quality information and the flow description information of the service data flow.

In specific implementation, the foregoing communications device may be specifically user equipment (UE). In a scenario in which the communication device is user equipment, a method for determining the data distribution policy is the same as the determining method previously described for the case in which the communication device is a user plane function entity. Details are not described herein.

In specific implementation, there are a plurality of methods for determining, by the communications device 10, the link quality information of the link used for transmitting the service data flow. For example, the methods may be the following several methods, or certainly may be another method in the prior art. This is not limited in this application.

Specifically, if the communications device is a user plane function entity, the communications device may determine the link quality information by using any one or a combination of the following methods:

Method 1: The communications device sends a link detection request message to user equipment, and receives link quality information from the user equipment.

Method 2: The communications device selects detected link quality on the user plane function entity as current link quality information.

Method 3: The communications device analyzes another service data flow on the user plane function entity to determine current link quality information.

Specifically, if the communications device is user equipment, the communications device may determine link quality by using the following methods.

Method 1: The communications device sends a link detection request message to a user plane function entity, and receives link quality information from the user plane function entity.

Method 2: The communications device selects detected link quality on the user equipment as current link quality information.

Method 3: The communications device analyzes another service data flow on the user equipment to determine current link quality information.

In second specific implementation, the communications device 10 first receives a reporting rule from the session management function entity 20, where the reporting rule is used to instruct the communications device 10 to report, when receiving a newly established service data flow of a first service type, flow description information of the service data flow of the first service type and link quality information of a link used for transmitting the service data flow. The service data flow of the first service type is a service data flow that supports multi-access transmission. Subsequently, the communications device 10 receives a service data flow of the first service type, and the communications device 10 determines first link quality information of a link used for transmitting the service data flow, and sends the first link quality information and flow description information of the service data flow to the session management function entity 20. Then, the communications device 10 receives a data distribution policy from the session management function entity 20, and distributes the service data on the link according to the data distribution policy. The data distribution policy is a data distribution policy that is determined based on an access policy and that is corresponding to the first link quality information and the flow description information of the service data flow. The access policy includes flow description information of a data flow, quality information of at least two links, and a data distribution policy of the data flow on the links.

In other words, the reporting rule specifies a method for reporting link quality information by a communications device. For example, for a newly established service data flow, when link quality information has not been obtained, the link quality information is reported. For a service data flow that has been sent, when link quality information is different from previously-reported link quality information (or in other words, there is a change between link quality information and the previously-reported link quality information), the link quality information is reported. That link quality information is different from previously-reported link quality information may be specifically as follows: When a difference between the link quality information and the previously-reported link quality information exceeds a threshold, the link quality information is reported. In this case, a corresponding threshold is provided in the reporting rule.

Service data can be sent on a plurality of links through interaction between network elements in the system. In addition, in a process of determining the data distribution policy, a policy of distributing data on different links may be determined based on a quality difference between the different links, thereby ensuring effective utilization of bandwidth on each link, and increasing a data transmission rate.

The access policy, the flow description information, the link, the data distribution policy, and the like in the second specific implementation are the same as those in the descriptions in the first specific implementation. Details are not described herein again.

In specific implementation, the data distribution policy is a data distribution policy that is determined by the session management function entity 20 based on the access policy and that is corresponding to the first link quality information and the flow description information of the service data flow. A specific method for determining the data distribution policy and a method for determining the first link quality information by the communications device 10 are the same as those in the descriptions in the first specific implementation. Details are not described herein again.

In specific implementation, the data distribution policy may also be dynamically updated based on a link status, so that the distribution policy can be adjusted for service data based on a current link, to improve data distribution efficiency. To dynamically update the data distribution policy, the reporting rule needs to be used for instructing the communications device 10 to report, when link quality of the link used for transmitting the service data flow changes, second link quality information of the link used for transmitting the service data flow. The second link quality information is changed (or updated) link quality information of the link used for transmitting the service data flow.

The communications device 10 determines the second link quality information. If the second link quality information is different from the first link quality information, the communications device 10 sends the second link quality information to the session management function entity 20, that is, the communications device 10 reports the second link quality information to the session management function entity 20.

Optionally, the communications device 10 receives an updated data distribution policy from the session management function entity 20. The communications device 10 distributes service data on the link according to the updated data distribution policy. The updated data distribution policy is a data distribution policy that is determined based on the access policy and that is corresponding to the second link quality information and the flow description information of the service data flow.

In the second specific implementation, the communications device 10 is a user plane function entity, user equipment, or another device.

In the foregoing second specific implementation, two data distribution methods are described. One is a data distribution method for a case in which the communications device receives a newly established service data flow, and the other is a data distribution method for a case in which a link is dynamically updated during service data transmission. The two methods may be used independently or in combination with each other.

The user equipment UE in this application may include a handheld device, a vehicle-mounted device, a wearable device, or a computing device that has a wireless communication function; another processing device connected to a wireless modem; or user equipment UE in various forms, including a mobile station (MS), a terminal, terminal equipment, a software terminal, and the like. For ease of description, in this application, the foregoing devices are collectively referred to as user equipment or UE.

In FIG. 1, the session management function entity 20 and the user plane function entity are merely names, and a name does not constitute a limitation on an entity. For example, the session management function entity 20 may alternatively be replaced with "session management function" or another name. In addition, the session management function entity 20 may alternatively correspond to an entity that has another function in addition to a session management function. The user plane function entity may alternatively be replaced with "user plane function" or another name. In addition, the user plane function entity may correspond to an entity that has another function in addition to a user plane function. A unified description is provided herein, and details are not described below.

Specifically, the foregoing data distribution system may be applied to a 4G network, a 5G network, and another network. This is not specifically limited in this embodiment of this application.

Figure 2:
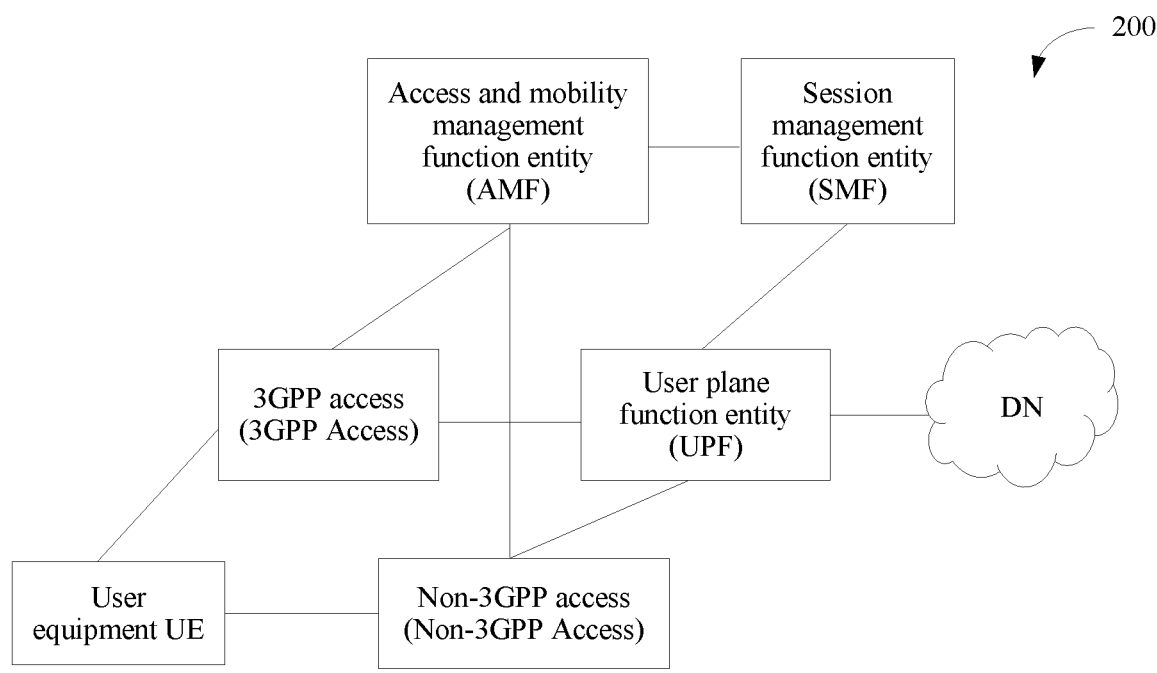
FIG. 2 is a schematic diagram of another possible system network according to an embodiment of the present invention.

FIG. 2 shows a specific example of a 5G system 200 according to this application. Certainly, this application is not limited to the system. The data distribution method provided in the embodiments of the present invention may be applied to the systems shown in FIG. 1 and FIG. 2.

The system shown in FIG. 2 includes a session management function (SMF), a user plane function (UPF), and an access and mobility management function (AMF). The SMF is an example of the session management function entity 20 in FIG. 1, and the UPF is an example of the communications device 10 in FIG. 1. The AMF is an access and mobility management function entity, and performs access and mobility management for UE. The SMF is a session management function entity, performs session management, receives a session or service flow control policy, and implement the policy, and may further select the UPF or another function. The UPF serves as an interface user plane function of a data network (DN), and implements functions such as user plane data forwarding and bandwidth limitation. The system may further include a 3GPP access network and a non-3GPP access network. UE may access a 5G core network simultaneously by using a 3GPP access technology and a non-3GPP access technology. Certainly, the UE may alternatively access the 5G core network by using another technology. This is not limited in this application.

In 4G, the session management function entity 20 may be a control plane network element, for example, a mobility management entity (MME). The communications device may be UE or a user plane network element. For example, the user plane network element is a packet data network gateway (P-GW).

In specific implementation, any function node or network element in the foregoing system 100 or system 200 may be implemented by an entity device, or may be jointly implemented by a plurality of entity devices. This is not specifically limited in this embodiment of the present invention. To be specific, it can be understood that any function node or network element in the foregoing system 100 or system 200 may be a logical function module in an entity device, or may be a logical function module including a plurality of entity devices. This is not specifically limited in this embodiment of the present invention.

In specific implementation, in an implementation, a multi-access protocol (MAP) protocol stack may be added to the UE and the UPF. The protocol stack may be located below an internet protocol (IP) layer. Alternatively, the MAP protocol stack may be located above the IP layer and below a transport layer. A location of the MAP protocol stack is not limited in this application. The MAP protocol stack may be used to implement data packet transmission between the UE and a network (for example, a UPF or an SMF) by using a multi-access technology. For example, during data packet transmission, a packet header of the MAP protocol stack is added to a data packet. With the MAP protocol stack, data packet sequence numbers may further be added to data packets to be distributed on a plurality of links. Certainly, the MAP protocol stack may alternatively be another protocol. This is not limited in this application.

Figure 3:
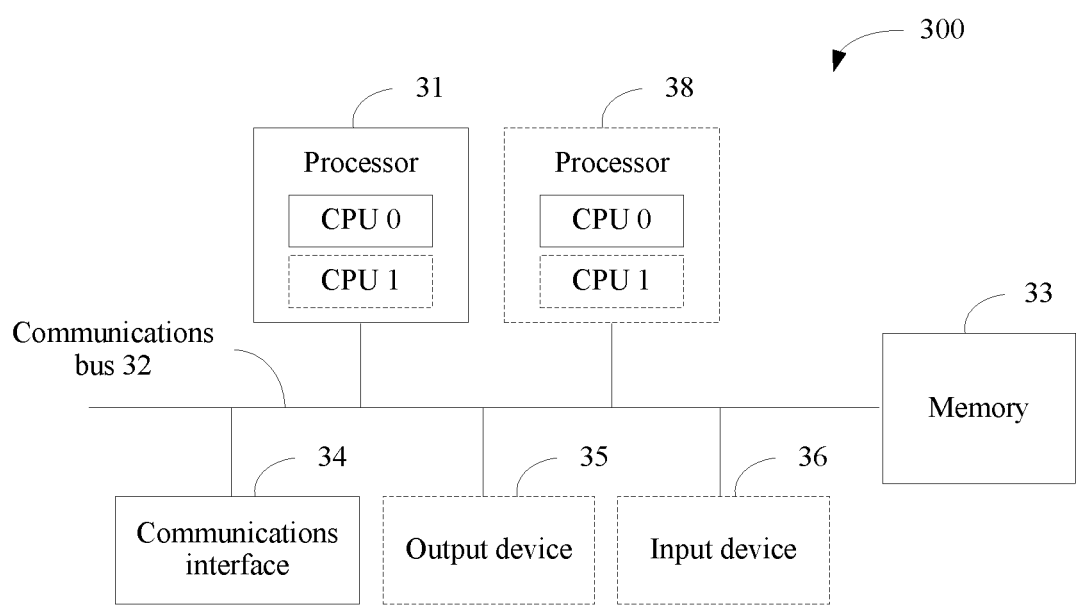
FIG. 3 is a schematic diagram of a computer device according to an embodiment of the present invention.

As shown in FIG. 3, the communications device in FIG. 1, or the UPF or the UE in FIG. 2 may be implemented in a manner of a computer device (or a system) in FIG. 3. FIG. 3 is a schematic diagram of a computer device according to an embodiment of the present invention. The computer device 300 includes at least one processor 31, a communications bus 32, a memory 33, and at least one communications interface 34.

The processor 31 may be a general-purpose central processing unit (CPU), a microprocessor, an application-specific integrated circuit (ASIC), or one or more integrated circuits configured to control program execution of the solution of the present invention.

The communications bus 32 may include a channel for transmitting information between the foregoing components. The communications interface 34 is configured to communicate with another device or a communications network such as an Ethernet, a radio access network (RAN), or a wireless local area network (Wireless Local Area Networks, WLAN) by using any apparatus such as a transceiver.

The memory 33 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another optical disk storage, an optical disc storage (including a compressed optical disc, a laser disc, an optical disc, a digital versatile optical disc, a Blu-ray disc, or the like), a magnetic disk storage medium, or another magnetic storage device, or any other medium that can be used to carry or store expected program code in a form of an instruction or a data structure and that can be accessed by a computer, but no limitation is set thereto. The memory may exist independently, and is connected to the processor by using the bus. Alternatively, the memory may be integrated with the processor.

The memory 33 is configured to store application program code for performing the solution of the present invention, and the processor 31 controls execution of the application program code. The processor 31 is configured to execute the application program code stored in the memory 33.

In specific implementation, in an embodiment, the processor 31 may include one or more CPUs, such as a CPU 0 and a CPU 1 in FIG. 3.

In specific implementation, in an embodiment, the computer device 300 may include a plurality of processors, such as the processor 31 and a processor 38 in FIG. 3. Each of these processors may be a single-core (single-CPU) processor, or may be a multi-core (multi-CPU) processor. The processor herein may be one or more devices, circuits, and/or processing cores used to process data (for example, a computer program instruction).

In specific implementation, in an embodiment, the computer device 300 may further include an output device 35 and an input device 36. The output device 35 communicates with the processor 31, and may display information in a plurality of manners. For example, the output device 35 may be a liquid crystal display (LCD), a light emitting diode (LED) display device, a cathode ray tube (CRT) display device, a projector, or the like. The input device 36 communicates with the processor 31, and may obtain external information or receive input of a user in a plurality of manners. For example, the input device 36 may be a camera, a mouse, a keyboard, a touchscreen device, or a sensor device.

The foregoing computer device 300 may be a general-purpose computer device or a special-purpose computer device. In specific implementation, the computer device 300 may be a camera device, a desktop computer, a portable computer, a network server, a personal digital assistant (PDA), a mobile phone, a tablet computer, a wireless terminal device, a communications device, a built-in device, or a device having a structure similar to that in FIG. 3. A type of the computer device 300 is not limited in this embodiment of the present invention.

For example, in the communications device 10 in FIG. 1, one or more software modules are stored in the memory. The communications device 10 can implement a software module by using the processor and the program code in the memory, to implement data distribution.

For example, for the UPF in FIG. 2, one or more software modules are stored in the memory. The UPF can implement a software module by using the processor and the program code in the memory, to implement data distribution.

The system shown in FIG. 2 is used as an example below to describe the data distribution method provided in the embodiments of the present invention with reference to a flowchart.

Figure 4:
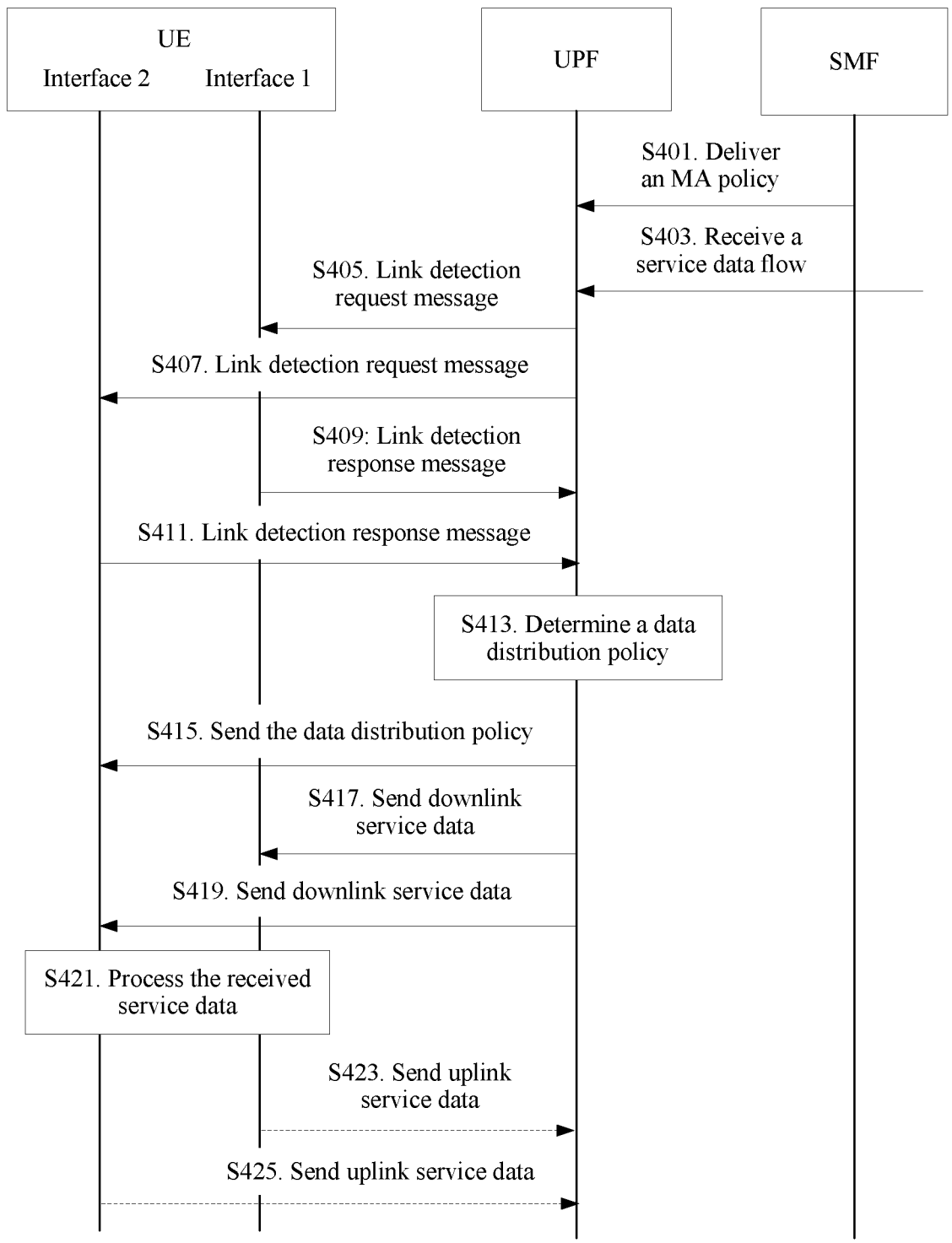
FIG. 4 is a schematic flowchart of a data distribution method according to an embodiment of the present invention.

FIG. 4 is a schematic flowchart of a data distribution method. In this embodiment, an example in which a communications device is a UPF is used, and an example in which UE supports a 3GPP access technology and a non-3GPP access technology is used. In the first specific implementation of FIG. 1, the method in this method embodiment may be used for interaction between the communications device 10 and the session management function entity 20 or interaction between the communications device and an external network element. The method in this method embodiment may also be used for interaction between the UPF and the SMF in FIG. 2 or interaction between the UPF and an external network element.

S401. An SMF sends an MA policy to the UPF, and the UPF receives the MA policy.

In specific implementation, the delivered MA policy may be determined by the SMF based on multi-access status information of the UE. The multi-access status information may include an access technology for accessing a network by the UE. The SMF may determine the multi-access status information of the UE by detecting a packet data network (PDN) connection status of each link of the UE.

In specific implementation, the delivered MA policy may also be determined by a policy control function (PCF). The PCF (not shown in the figure) determines the MA policy by using the multi-access status information of the UE, and then sends the MA policy to the SMF, and the SMF delivers the MA policy to the UPF. The MA policy may also be delivered to the UE.

After the MA policy is delivered to the UPF, the UPF may store the MA policy. A manner of storing the MA policy is not limited in this application. For example, the MA policy may be stored in a form of a table, may be stored in a form of an entry, or may be represented by using a specific formula.

A data distribution policy included in the MA policy may specifically include a distribution ratio of a data flow on the links. A specific example is used herein to describe the MA policy. For example, the MA policy may be as follows: When a user browses a web service by using UE, a 3GPP access technology and a non-3GPP technology are used for access. When a bandwidth ratio of a 3GPP link to a non-3GPP link is 1:1, and a latency difference between the 3GPP link and the non-3GPP link is 10 ms, a data sending ratio of the 3GPP link to the non-3GPP link is 1:1. When a user watches an AR video service by using UE, a 3GPP access technology and a non-3GPP technology are used for access. When a bandwidth ratio of a 3GPP link to a non-3GPP link is 2:1 and a latency difference between the 3GPP link and the non-3GPP link is 12 ms, a data sending ratio of the 3GPP link to the non-3GPP link is 1.5:1. This is just an example of the MA policy. In specific implementation, another policy may be further included. This is not limited in this application.

In specific implementation, although UE uses a plurality of access technologies, a transmission link corresponding to one or more access technologies may be faulty. An example in which the UE accesses a network by using a 3GPP access technology and a non-3GPP technology is used. For example, if a 3GPP link is faulty, a data sending ratio of the 3GPP link to a non-3GPP link is 0:1 (or in other words, data is sent by using only the non-3GPP link). In other words, the data is sent by using only the non-3GPP link, that is, by using a single channel. Therefore, in specific implementation, the MA policy includes data distribution in a case of a link fault. For example, when a user watches an AR video service by using UE, a 3GPP access technology and a non-3GPP technology are used for access. When a bandwidth ratio of a 3GPP link to a non-3GPP link is 0:1, a data sending ratio of the 3GPP link to the non-3GPP link is 0:1.

In specific implementation, the data distribution policy may further include a waiting latency for a receiving party to perform data reordering. Corresponding to the MA policy in the foregoing example, that is, for the example in which the user browses the web service by using the UE, the following is added to the MA policy: a waiting latency for the receiving party to perform reordering is 15 ms; for the example in which the user watches the AR video service by using the UE, the following is added to the MA policy: a waiting latency for the receiving party to perform reordering is 10 ms.

In specific implementation, the data distribution policy may further include a data sending sequence. Details are not described herein.

In specific implementation, the service data further includes a data packet sequence number. The sequence number may be used by the receiving party to reorder received service data, or may be used to send data in sequence. For example, the data distribution policy further includes a data sending sequence. If data sequence numbers are 1 to 7, the sending sequence may be as follows: sending packets of the sequence numbers 1 to 3 by using a link corresponding to the 3GPP access technology, and sending packets of the sequence numbers 4 to 7 by using a link corresponding to the non-3GPP access technology.

S403. The UPF receives a service data flow.

In specific implementation, the service data flow may be a downlink service data flow sent to the UE. After receiving the downlink data flow, the UPF determines flow description information of the data flow. If an MA policy on the UPF includes the flow description information of the service data flow, S405 is performed.

There are many methods for determining the flow description information of the service data flow by the UPF. For example, a deep data packet detection technology may be used to identify the flow description information of the service data flow.

In this example, it is assumed that the UPF determines that the service data flow is a data flow generated when a user watches an AR video service, and the MA policy on the UPF is the MA policy in the foregoing example. Because the MA policy includes a policy for AR video service watching, S405 starts to be performed.

S405. The UPF sends a link detection request message to an interface 1 of the UE, and the UE receives the link detection request message, where the interface 1 is corresponding to a port corresponding to a 3GPP technology used by the UE.

S407. The UPF sends a link detection request message to an interface 2 of the UE, and the UE receives the link detection request message, where the interface 2 is corresponding to a port corresponding to a non-3GPP technology used by the UE.

There is no specific sequence between S407 and S405.

It should be noted that in this embodiment, two interfaces, the interface 1 and the interface 2, are used as examples. In actual implementation, there may be three or more interfaces. For example, if the UE performs access by using three access technologies: 3GPP access, WLAN, and Wi-Fi, interfaces corresponding to the three access technologies may be respectively interfaces 1, 2, and 3. Correspondingly, there are three links between the UE and the UPF. Details are not described herein.

S409. The UE sends a link detection response message to the UPF, and the UPF receives the link detection response message.

The link detection response message carries link quality information of a link between the interface 1 and the UPF.

S411. The UE sends a link detection response message to the UPF, and the UPF receives the link detection response message.

The link detection response message carries link quality information of a link between the interface 2 and the UPF.

There is no specific sequence between S409 and S411.

S413. The UPF determines, based on the MA policy, a data distribution policy, for a link, corresponding to quality information of a link used for transmitting the service data flow and the flow description information of the service data flow. It can be understood that the link used for transmitting the service data flow includes the link between the interface 1 and the UPF and the link between the interface 2 and the UPF.

In specific implementation, if the MA policy on the UPF exists in the form of a table, the UPF queries the table to determine the data distribution policy, for the link, corresponding to the quality information of the link and the flow description information of the service data flow.

In specific implementation, if the MA policy on the UPF exists in a formula manner, the UPF selects a corresponding formula in the MA policy based on the flow description information of the service data flow, and determines the data distribution policy by using detected link quality information.

S415. The UPF sends the determined data distribution policy to the UE, and the UE receives the data distribution policy.

In specific implementation, the UPF may send the data distribution policy to the UE by using the interface 1 or the interface 2. A specific implementation is not limited in this application.

S417. The UPF sends downlink service data to the interface 1 of the UE according to the determined data distribution policy, and the UE receives the downlink service data.

The service data carries a data packet sequence number, and the data packet sequence number is used by the UE to reorder received service data based on the sequence number.

S419. The UPF sends downlink service data to the interface 2 of the UE according to the determined data distribution policy, and the UE receives the downlink service data.

S421. The UE processes the received downlink service data.

In specific implementation, the processing herein may be: The UE reorders the received service data based on the data packet sequence number carried in the downlink service data.

If a data reordering waiting latency is sent in S415, processing herein may alternatively be: In a process of reordering service data, the UE waits to receive a data packet based on a data reordering waiting latency of the UE that is carried in the data distribution policy.

In specific implementation, if there is a MAP protocol stack in the UE, when receiving the downlink service data, the MAP protocol stack unpacketizes a data packet to a MAP layer, and completes data packet reordering based on a sequence number added by a MAP protocol stack at a transmit end of the service data.

By using the foregoing solution, service data can be sent on a plurality of links. In addition, in a process of determining the data distribution policy, a policy of distributing data on different links may be determined based on a quality difference between the different links, thereby ensuring effective utilization of bandwidth on each link, and increasing a data transmission rate.

In specific implementation, after S421, the following operations may be further performed:

S423. The UE sends uplink service data on a link between the interface 1 and the UPF according to the data distribution policy, and the UPF receives the uplink service data.

In specific implementation, the uplink service data may be a response message specific to the received downlink message, or may be other uplink service data.

S425. The UE sends uplink service data on a link between the interface 2 and the UPF according to the data distribution policy, and the UPF receives the uplink service data.

In specific implementation, before step S401, optionally, step S400 may be further included.

S400. The UE reports multi-access capability information of the UE to the SMF, and the SMF receives the multi-access capability information of the UE.

After receiving the multi-access capability information of the UE, the SMF may subsequently deliver different MA policies to the UE based on different terminal types of the UE. The multi-access capability information may include terminal types of the UE. The terminal types may be a mobile phone, an internet of vehicles terminal, an AR helmet, and the like.

In specific implementation, the MA policy may be continuously updated. Specifically, an access capability of the UE may change, for example, the terminal loses an access capability. After the access capability of the UE changes, the UE may further report a changed access capability to the SMF, so that the SMF determines a new MA policy based on the changed access capability of the terminal. Certainly, the SMF may alternatively determine a new MA policy according to the method in S401. After determining the new MA policy, the SMF sends the new policy to the UPF or the UE. Subsequently, the UPF or the UE sends service data according to the new policy.

In specific implementation, the data distribution policy may alternatively be dynamically updated. For example, when link quality changes, the UPF determines an updated data distribution policy based on changed link quality. Subsequently, the UPF or the UE sends service data according to the new policy. A change of the link quality may be learned of by the UPF regularly or irregularly through detection.

In the foregoing method embodiment, an action of the UE may be performed by the UE according to the application code stored by the memory 33 and invoked by the processor in FIG. 3. This is not limited in this embodiment of this application.

Figure 5:
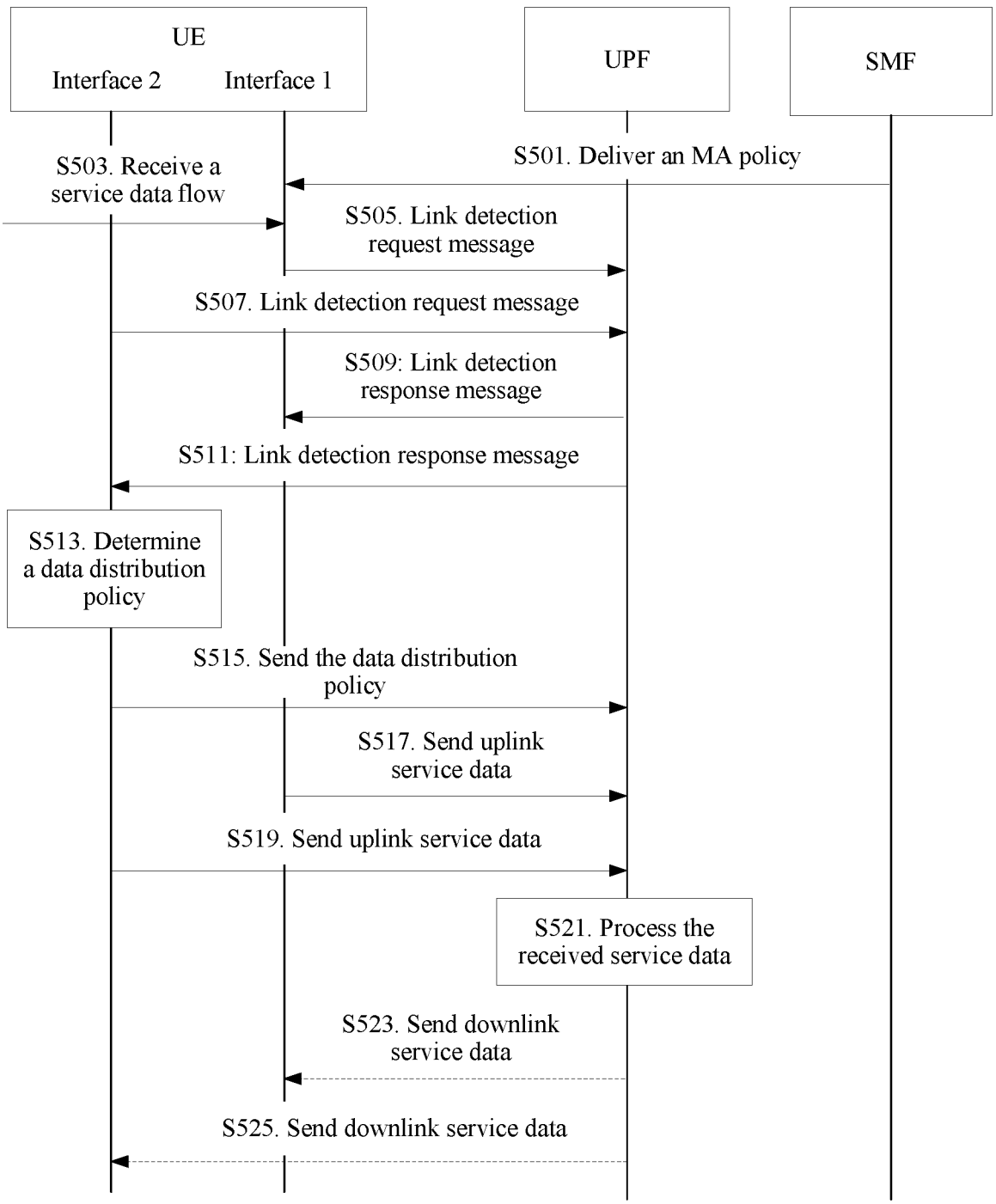
FIG. 5 is a schematic flowchart of another data distribution method according to an embodiment of the present invention.

FIG. 5 is another schematic flowchart of a data distribution method. In this embodiment, an example in which a communications device is UE is used; and an example in which the UE supports a 3GPP access technology and a non-3GPP access technology is used. In the first specific implementation of FIG. 1, the method in this method embodiment may be used for interaction between the communications device 10 and the session management function entity 20 or interaction between the communications device and an external network element. The method in this method embodiment may also be used for interaction between the UE and the SMF in FIG. 2 or interaction between the UE and an external network element.

S501. An SMF delivers an MA policy to the UE, and the UE receives the MA policy.

After the MA policy is delivered to the UE, the UE may store the MA policy. The MA policy may alternatively be delivered to a UPF.

For a method for determining the MA policy by the SMF, a manner in which the UE stores the MA policy, and the MA policy, refer to related descriptions in S401. Details are not described herein again.

S503. The UE receives a service data flow.

In specific implementation, the service data flow may be an uplink service data flow. After receiving a downlink data flow, the UE determines flow description information of the data flow. If the MA policy on the UE includes the flow description information of the service data flow, S505 is performed.

A method for determining the flow description information of the service data flow by the UE is similar to the method for determining the flow description information by the UPF in S403. Details are not described herein again.

S505. The UE sends a link detection request message to a UPF by using an interface 1, and the UPF receives the link detection request message.

S507. The UE sends a link detection request message to the UPF by using an interface 2, and the UPF receives the link detection request message.

There is no specific sequence between S507 and S505.

S509. The UPF sends a link detection response message to the UE, and the UE receives the link detection response message.

The link detection response message carries link quality information of a link between the interface 1 and the UPF.

S511. The UPF sends a link detection response message to the UE, and the UE receives the link detection response message.

The link detection response message carries link quality information of a link between the interface 2 and the UPF.

There is no specific sequence between S4509 and S511.

S513. The UE determines, based on the MA policy, a data distribution policy, for a link, corresponding to quality information of a link used for transmitting the service data flow and flow description information of the service data flow.

A method for determining the data distribution policy by the UE is similar to the method for determining the data distribution policy by the UPF in S413. Details are not described herein again.

S515. The UE sends the determined data distribution policy to the UPE, and the UPF receives the data distribution policy.

In specific implementation, the UE may send the data distribution policy to the UPF by using the interface 1 or the interface 2. A specific implementation is not limited in this application.

S517. The UE sends uplink service data to the UPF according to the determined data distribution policy, and the UPF receives the uplink service data.

The service data carries a data packet sequence number, and the data packet sequence number is used by the UPF to reorder received service data based on the sequence number.

S519. The UPE sends uplink service data to the UPF according to the determined data distribution policy, and the UPF receives the uplink service data.

S521. The UPF processes the received uplink service data.

For a method for processing the uplink service data by the UPF, refer to the method for processing the downlink service data by the UE in S421. Details are not described herein again.

By using the foregoing solution, service data can be sent on a plurality of links. In addition, in a process of determining the data distribution policy, a policy of distributing data on different links may be determined based on a quality difference between the different links, thereby ensuring effective utilization of bandwidth on each link, and increasing a data transmission rate.

In specific implementation, after S521, the following operations may be further performed:

S523. The UPF sends downlink service data to the interface 1 of the UE according to the data distribution policy, and the UE receives the downlink service data.

In specific implementation, the downlink data may be a response message specific to the received uplink message, or may be other downlink data.

S525. The UPF sends downlink service data to the interface 2 of the UE according to the data distribution policy, and the UE receives the downlink service data.

In specific implementation, before step S501, optionally, step S500 may be further included. S500 is the same as S400.

In specific implementation, the MA policy and the data distribution policy may be continuously updated as described in FIG. 4.

In the foregoing method embodiment, an action of the UE may be performed by the UE according to the application code stored in the memory 33 and invoked by the processor in FIG. 3. This is not limited in this embodiment of this application.

Figure 6:
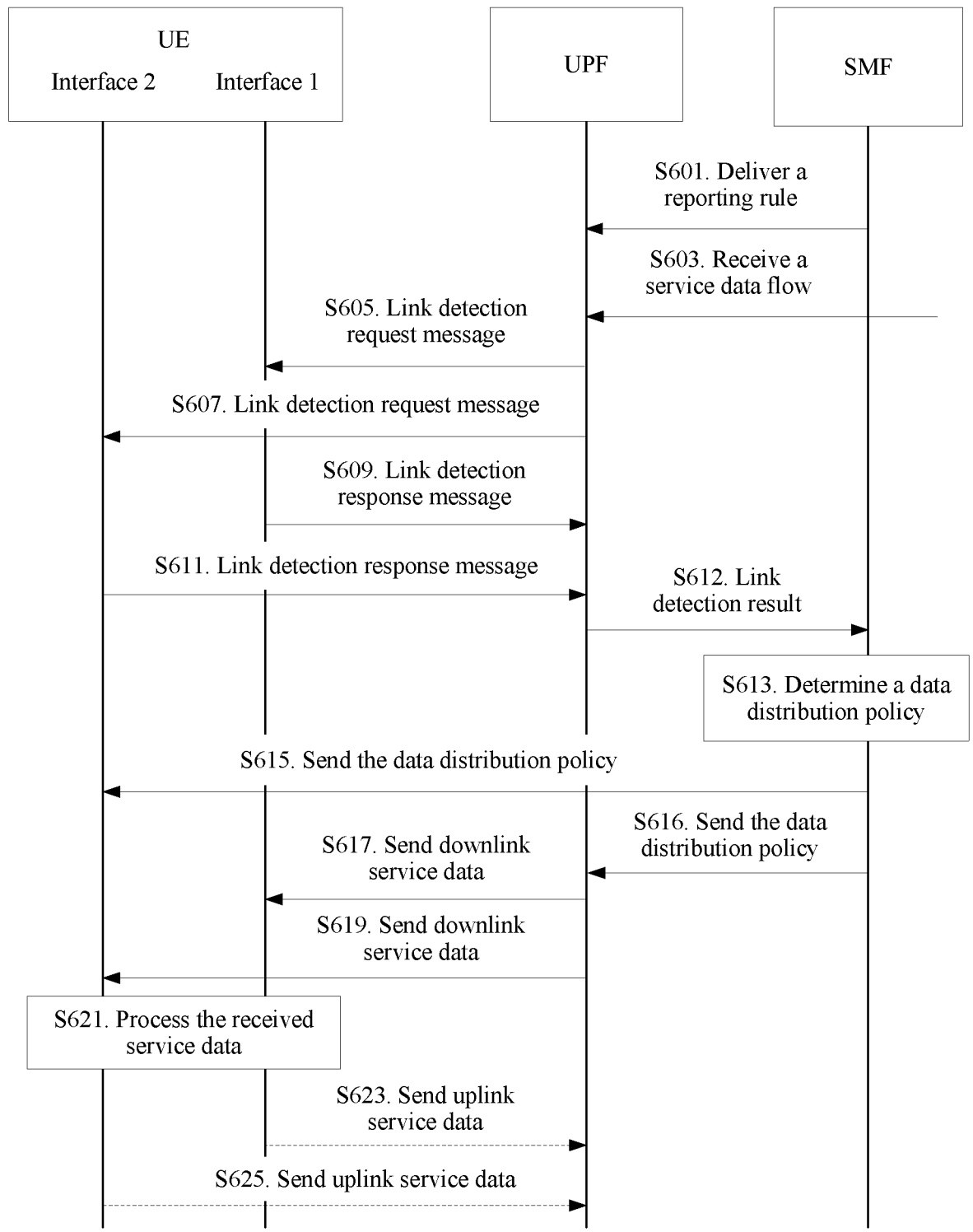
FIG. 6 is a schematic flowchart of still another data distribution method according to an embodiment of the present invention.

FIG. 6 is still another schematic flowchart of a data distribution method. In this embodiment, an example in which a communications device is a UPF is used; and an example in which UE supports a 3GPP access technology and a non-3GPP access technology is used. In the second specific implementation of FIG. 1, the method in this method embodiment may be used for interaction between the communications device 10 and the session management function entity 20 or interaction between the communications device and an external network element. The method in this method embodiment may also be used for interaction between the UPF and the SMF in FIG. 2 or interaction between the UPF and an external network element.

S601. An SMF delivers a reporting rule to the UPF, and the UPF receives the reporting rule.

The reporting rule is used to instruct the UPF to report, when receiving a newly established service data flow of a first service type, flow description information of the service data flow and link quality information of a link used for transmitting the service data flow. The service data flow of the first service type is a service data flow that supports multi-access transmission.

S603. The UPF receives a service data flow.

In specific implementation, the service data flow may be a downlink service data flow sent to the UE. After receiving the downlink data flow, the UPF determines a service type of the data flow. If the service type is the first service type, S605 is performed.

S605 to S611 are the same as S405 to S411.

S612. The UPF sends quality information of a link used for transmitting the service data flow and flow description information of the service data flow to the SMF, and the SMF receives the link quality information and the flow description information of the service data flow.

S613. The SMF determines, based on an MA policy, a data distribution policy, for a link, corresponding to the quality information of the link used for transmitting the service data flow and the flow description information of the service data flow.

In the second specific implementation, the MA policy on the SMF is similar to the MA policy in the first specific implementation.

A method for determining the data distribution policy by the SMF is similar to the method for determining the data distribution policy by the UPF in S413. Details are not described herein again.

S615. The SMF sends the data distribution policy to the UE, and the UE receives the data distribution policy.

In specific implementation, the UPF may send the data distribution policy to the UE by using the interface 1 or the interface 2. A specific implementation is not limited in this application. This step is optional.

S616. The SMF sends the data distribution policy to the UPF, and the UPF receives the data distribution policy.

There is no specific sequence between S615 and S616.

S617 to S621 are the same as S417 to S421.

By using the foregoing solution, service data can be sent on a plurality of links. In addition, in a process of determining the data distribution policy, a policy of distributing data on different links may be determined based on a quality difference between the different links, thereby ensuring effective utilization of bandwidth on each link, and increasing a data transmission rate.

In specific implementation, after S621, S623 to S625 may be further performed.

S623 to S625 are the same as S423 to S425.

In specific implementation, the MA policy may be continuously updated as described in FIG. 4.

In specific implementation, the data distribution policy may alternatively be dynamically updated. For example, when link quality changes, the UPF reports changed link quality to the SMF, and then the SMF updates the data distribution policy based on the changed link quality. The following provides a description by using FIG. 8. It should be noted that two methods shown in FIG. 8 and FIG. 6 (or FIG. 7) may be independently performed, or may be performed together.

In the foregoing method embodiment, an action of the UPF may be performed by the UPF or an action of the SMF may be performed by the SMF according to the application code stored by the memory 33 and invoked by the processor in FIG. 3. This is not limited in this embodiment of this application.

Figure 7:
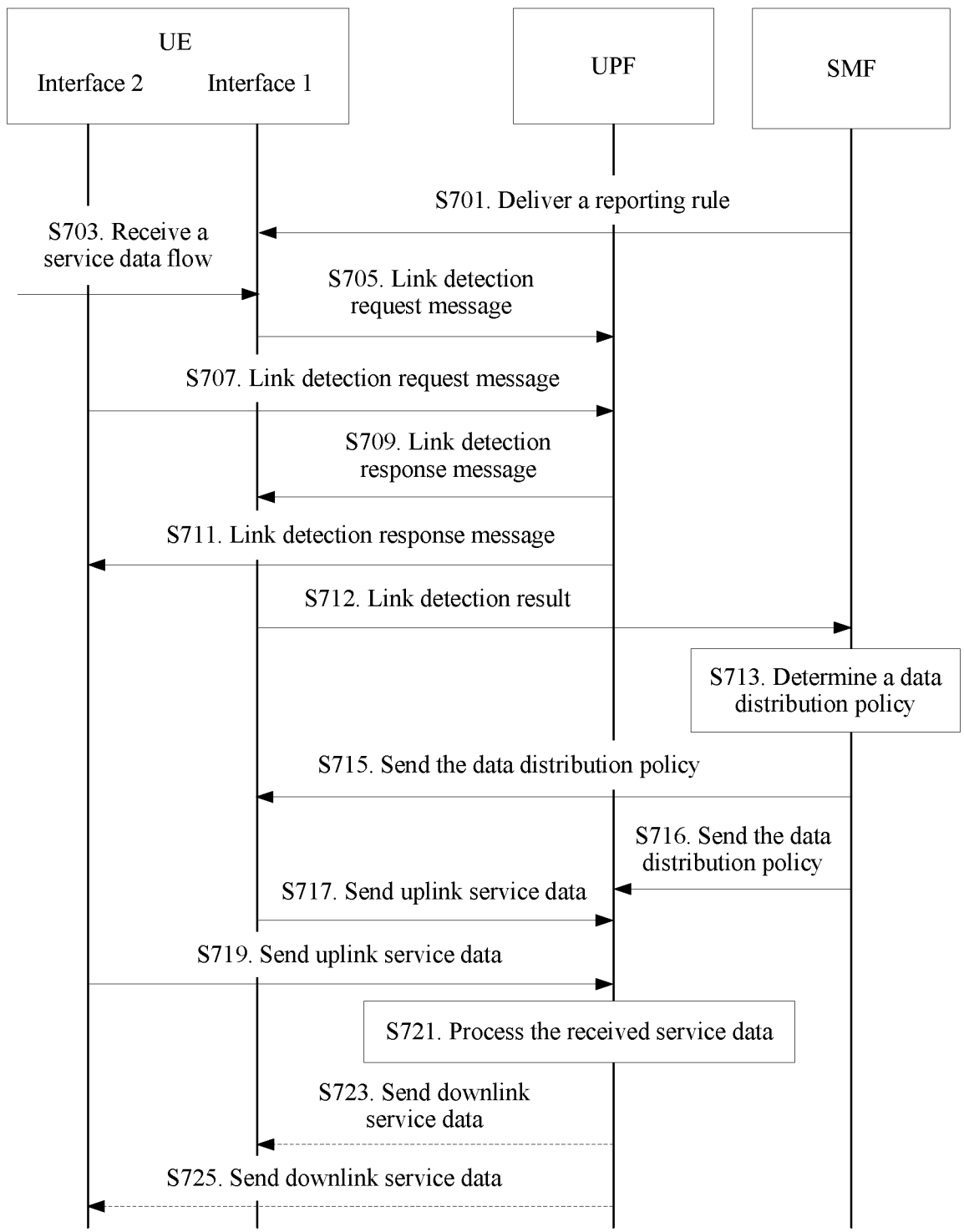
FIG. 7 is a schematic flowchart of yet another data distribution method according to an embodiment of the present invention.

FIG. 7 is yet another schematic flowchart of a data distribution method. In this embodiment, an example in which a communications device is UE is used; and an example in which the UE supports a 3GPP access technology and a non-3GPP access technology is used. In the second specific implementation of FIG. 1, the method in this method embodiment may be used for interaction between the communications device 10 and the session management function entity 20 or interaction between the communications device and an external network element. The method in this method embodiment may also be used for interaction between the UE and the SMF in FIG. 2 or interaction between the UE and an external network element.

S701. An SMF delivers a reporting rule to the UE, and the UE receives the reporting rule.

The reporting rule is the same as that in S601.

S703. The UE receives a service data flow.

In specific implementation, the service data flow may be an uplink service data flow. After receiving the uplink data flow, the UE determines a service type of the data flow. If the service type is a first service type, S705 is performed.

S705 to S711 are the same as S505 to S511.

S712. The UE sends quality information of a link used for transmitting the service data flow and flow description information of the service data flow to the SMF, and the SMF receives the link quality information and the flow description information of the service data flow.

S713. The SMF determines, based on an MA policy, a data distribution policy, for a link, corresponding to the quality information of the link used for transmitting the service data flow and the flow description information of the service data flow.

In the second specific implementation, the MA policy on the SMF is similar to the MA policy in the first specific implementation.

A method for determining the data distribution policy by the SMF is similar to the method for determining the data distribution policy by the UPF in S413. Details are not described herein again.

S715. The SMF sends the data distribution policy to the UE, and the UE receives the data distribution policy.

In specific implementation, the UPF may send the data distribution policy to the UE by using the interface 1 or the interface 2. A specific implementation is not limited in this application.

S716. The SMF sends the data distribution policy to the UPF, and the UPF receives the data distribution policy. This step is optional.

There is no specific sequence between S715 and S716.

S717 to S721 are the same as S517 to S521.

By using the foregoing solution, service data can be sent on a plurality of links. In addition, in a process of determining the data distribution policy, a policy of distributing data on different links may be determined based on a quality difference between the different links, thereby ensuring effective utilization of bandwidth on each link, and increasing a data transmission rate.

In specific implementation, after S721, S723 to S725 may be further performed.

S723 to S725 are the same as S523 to S525.

In specific implementation, the MA policy may be continuously updated as described in FIG. 4.

Figure 8:
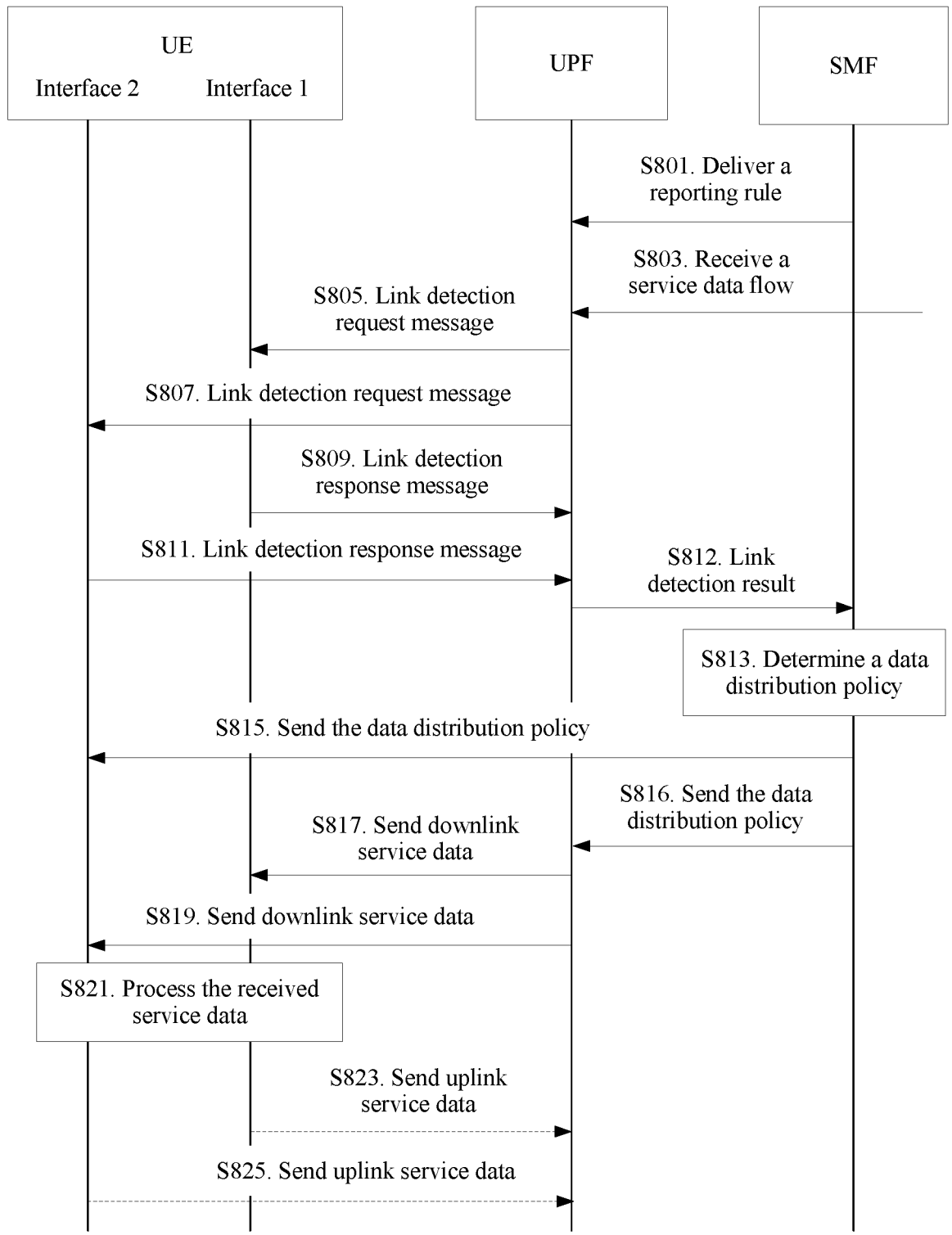
FIG. 8 is a schematic flowchart of still yet another data distribution method according to an embodiment of the present invention.

In specific implementation, the data distribution policy may alternatively be dynamically updated. For example, when link quality changes, the UE reports changed link quality to the SMF, and then the SMF updates the data distribution policy based on the changed link quality. For a specific method for dynamically updating the data distribution policy, refer to FIG. 8. A difference between the method in this embodiment and that in FIG. 8 is that, in this embodiment, the SMF sends the reporting rule to the UE, and the UE detects link quality; and correspondingly, the UE sends the updated link quality to the SMF. Details are not described herein again.

In the foregoing method embodiment, an action of the UE may be performed by the UE according to the application code stored by the memory 33 and invoked by the processor in FIG. 3. This is not limited in this embodiment of this application.

FIG. 8 is still yet another schematic flowchart of a data distribution method. In this embodiment, an example in which a communications device is a UPF is used; and an example in which UE supports a 3GPP access technology and a non-3GPP access technology is used. In the second specific implementation of FIG. 1, the method in this method embodiment may be used for interaction between the communications device 10 and the session management function entity 20 or interaction between the communications device and an external network element. The method in this method embodiment may also be used for interaction between the UE and the SMF in FIG. 2 or interaction between the UE and an external network element.

S801. An SMF delivers a reporting rule to the UPF, and the UPF receives the reporting rule. The reporting rule is used to instruct the communications device to report, when link quality of a link used for transmitting a service data flow of a first service type changes, updated link quality information of the link used for transmitting the service data flow. In this embodiment, for ease of description, the link quality information before link update is referred to as first link quality information, and the updated link quality information is referred to as second link quality information.

S803 is the same as S603. This step is optional.

S805 to S811 are the same as S605 to S611.

A link quality detection method is the same as that illustrated in the foregoing description in FIG. 1, and there are a plurality of link quality detection methods. This embodiment merely provides an example.

S812. The UPF sends second link quality information to the SMF, and the SMF receives the second link quality information.

In this step, optionally, the UPF may further send flow description information and the second link quality information together to the SMF. If the UPF does not send the flow description information in this step, the SMF may use flow description information sent by the UPF when the UPF receives a newly established service data flow of the first service type.

Optionally, before S812 is performed, the method may further include: If the UPF determines that there is a change between the second link quality information collected this time and the previously collected first link quality information, S812 is performed.

That the UPF determines that there is a change between the second link quality information collected this time and the previously collected first link quality information may be specifically: If an amount of the change between the second link quality information and the first link quality information exceeds a preset threshold, S812 is performed.

S813. The SMF determines, based on an MA policy, an updated data distribution policy, for a link, corresponding to the second link quality information of the link and flow description information of the service data flow.

S815 to S825 are similar to S615 to S625. A difference is that, in these steps, a data distribution policy used is the updated data distribution policy.

By using the method in this embodiment, the updated link quality information is obtained, to determine a new data distribution policy for different links based on the updated link quality information, thereby ensuring effective utilization of bandwidth on each link, and increasing a data transmission rate.

In the foregoing method embodiment, an action of the UPF may be performed by the UPF or an action of the SMF may be performed by the SMF according to the application code stored by the memory 33 and invoked by the processor in FIG. 3. This is not limited in this embodiment of this application.

In specific implementation, data transmission between the UE and the UPF in the foregoing method in this application may be implemented by adding a MAP protocol stack to the UE and the UPF.

Figure 9:
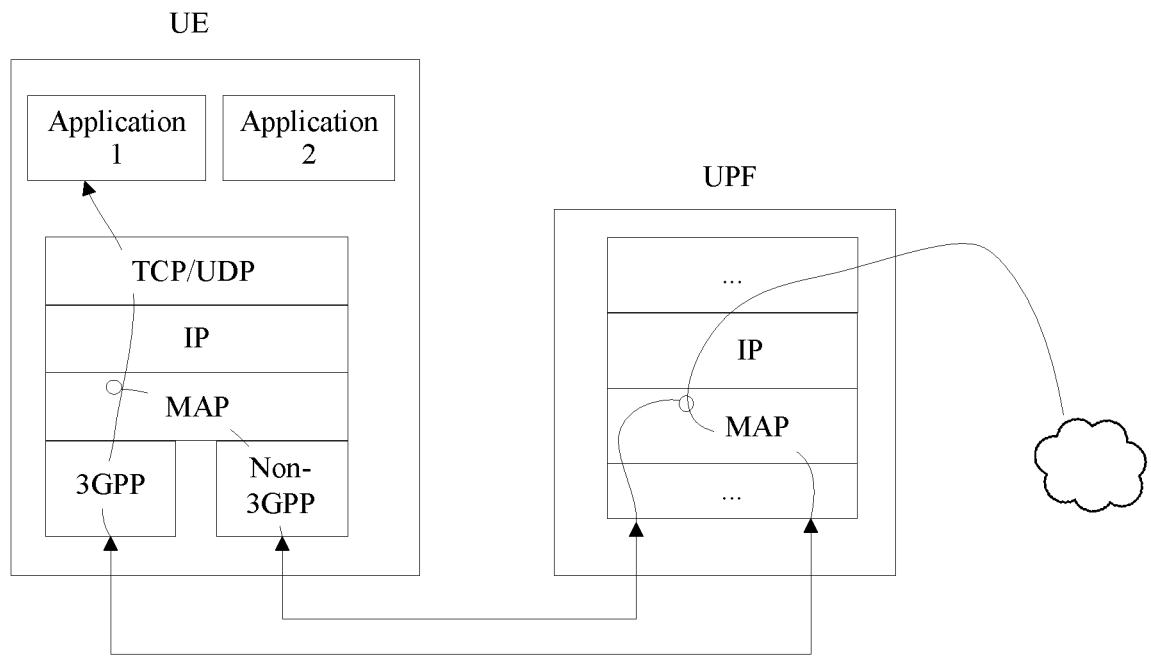
FIG. 9 is a schematic diagram of data transmission between UE and a UPF according to an embodiment of the present invention.

FIG. 9 is a schematic diagram of data transmission between UE and a UPF. That the UE supports two access technologies: 3GPP and non-3GPP access technologies is used as an example. The UE and the UPF each have a transmission control protocol (TCP)/user datagram protocol (UDP) layer, an IP layer, a MAP layer, and the like. The foregoing three layers are shown herein as an example.

For example, for downlink service data, after passing through the MAP protocol stack in the UPF, the downlink service data is divided into two pieces of data carrying a packet header of the MAP protocol stack and sent to the UE. The two pieces of data are sent to the UE by using two links (that is, links corresponding to the access technologies) between the UPF and the UE. Then, in the MAP protocol stack of the UE, data packets are aggregated based on packet headers of the MAP protocol stack carried in the data, and then uploaded to an application 1. The application 1 may be, for example, an AR video service. There may be another application such as an application 2 in the UE. During aggregation, an operation such as reordering may be further performed on the data. Correspondingly, similar transmission methods are also used for a link detection request message and a link detection response message.

For example, for uplink service data, after passing through the MAP protocol stack in the UE, uplink service data of an application 1 is divided into two pieces of data carrying a packet header of the MAP protocol stack and sent to the UPF. The two pieces of data are sent to the UPF by using two links (that is, the links corresponding to the access technologies) between the UE and the UPF. Then, in the MAP protocol stack of the UPF, data packets are aggregated based on packet headers of the MAP protocol stack carried in the data. During aggregation, an operation such as reordering may be further performed on the data. Correspondingly, similar transmission methods are also used for a link detection request message and a link detection response message.

The foregoing mainly describes the solutions provided in the embodiments of the present invention from a perspective of interaction between network elements. It can be understood that the foregoing communications device (or apparatus) is specifically a UPF or UE. To implement the foregoing functions, the UPF or the UE includes a hardware structure and/or a software module corresponding to each function. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application. In the embodiments of the present invention, the communications device (or apparatus) may be divided into function modules based on the foregoing method examples. For example, each function module may be obtained through division for a corresponding function, or two or more functions may be integrated into one processing module. The integrated module may be implemented in a form of hardware, or may be implemented in a form of a software function module. It should be noted that, in this embodiment of the present invention, module division is an example, and is merely a logical function division. In actual implementation, another division manner may be used.

Figure 10:
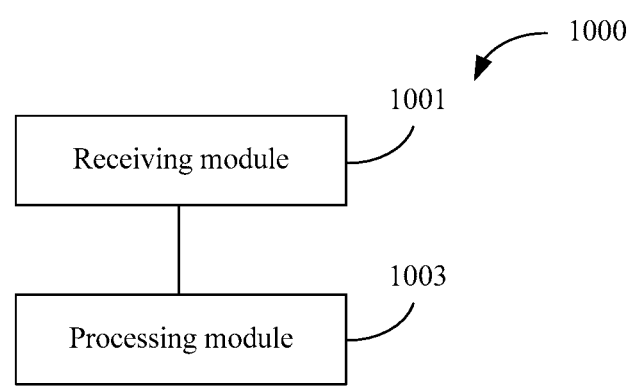
FIG. 10 is a schematic structural diagram of a data distribution apparatus according to an embodiment of the present invention.

For example, when function modules are obtained through division based on corresponding functions, FIG. 10 is a schematic structural diagram of a communications device in the foregoing embodiment (for example, the embodiment corresponding to FIG. 4 or FIG. 5) corresponding to the first specific implementation. The communications device 1000 includes a receiving module 1001 and a processing module 1003.

The receiving module 1001 is configured to receive an access policy from a session management function entity, and is further configured to receive a service data flow, where the access policy includes flow description information of a data flow, quality information of at least two links, and a data distribution policy of the data flow on the links.

The processing module 1003 is configured to: when the access policy includes flow description information of the service data flow, determine link quality information of a link used for transmitting the service data flow; and distribute the service data on the link according to the data distribution policy, where the data distribution policy is a data distribution policy that is determined based on the access policy and that is corresponding to the link quality information and the flow description information of the service data flow.

In a possible implementation, that the processing module 1003 is configured to distribute the service data flow on the link according to the data distribution policy includes: the processing module 1003 is configured to send, based on a distribution ratio of the data flow on the links, the service data on the corresponding link at the corresponding distribution ratio.

In a possible implementation, the receiving module 1001 is further configured to receive an updated access policy from the session management function entity.

In a possible implementation, the processing module 1003 is further configured to determine, based on the access policy, a data distribution policy corresponding to the link quality information and the flow description information of the service data flow.

The communications device 1000 may be a UPF, may be UE, or may be another device in a communications network. For all related content of the steps in the method embodiment corresponding to the first specific implementation, refer to a function description of corresponding function modules. Details are not described herein.

Figure 11:
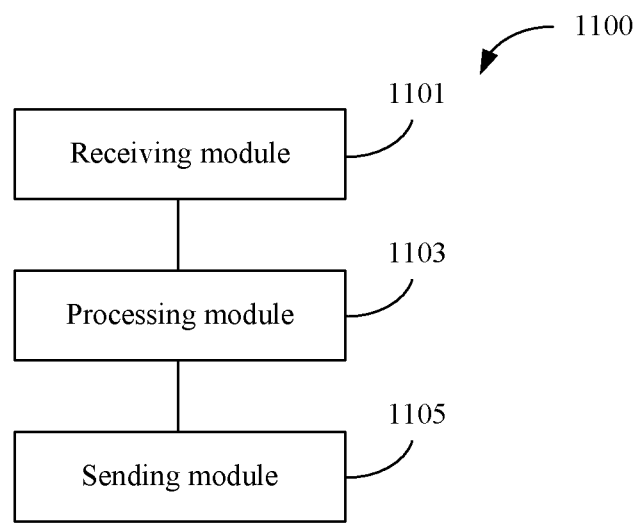
FIG. 11 is a schematic structural diagram of another data distribution apparatus according to an embodiment of the present invention.

For another example, when function modules are obtained through division based on corresponding functions, FIG. 11 is a schematic structural diagram of a communications device in the foregoing embodiment (for example, the embodiment corresponding to FIG. 6 or FIG. 7) corresponding to the second specific implementation. The communications device 1100 includes a receiving module 1101, a processing module 1103, and a sending module 1105.

The receiving module 1101 is configured to receive a reporting rule from a session management function entity, where the reporting rule is used to instruct the communications device to report, when receiving a newly established service data flow of a first service type, flow description information of the service data flow and link quality information of a link used for transmitting the service data flow, and the service data flow of the first service type is a service data flow that supports multi-access transmission; and further configured to receive a service data flow of the first service type.

The processing module 1103 is configured to determine first link quality information of a link used for transmitting the service data flow. The sending module 1105 is configured to send the first link quality information and flow description information of the service data flow to the session management function entity.

The receiving module 1101 is further configured to receive the data distribution policy from the session management function entity. The processing module 1103 is further configured to distribute the service data on the link according to the data distribution policy, where the data distribution policy is a data distribution policy that is determined based on the access policy and that is corresponding to the first link quality information and the flow description information of the service data flow, and the access policy includes flow description information of a data flow, quality information of at least two links, and a data distribution policy of the data flow on the links.

In a possible implementation, the data distribution policy includes a distribution ratio of the data flow on the links; and correspondingly, that the processing module 1103 is configured to distribute the service data flow on the link according to the data distribution policy includes: the processing module 1103 is configured to send, based on the distribution ratio of the data flow on the links, the service data on the corresponding link at the corresponding distribution ratio.

In a possible implementation, the reporting rule is further used to instruct the communications device to report, when link quality of the link used for transmitting the service data flow changes, second link quality information of the link used for transmitting the service data flow; and the second link quality information is changed link quality information; and correspondingly, the processing module 1103 is further configured to determine the second link quality information of the link used for transmitting the service data flow, where if the second link quality information is different from the first link quality information, the communications device sends the second link quality information to the session management function entity.

In a possible implementation, the receiving module 1101 is further configured to receive an updated data distribution policy from the session management function entity; and the processing module 1103 is further configured to distribute the service data on the link according to the updated data distribution policy, where the updated data distribution policy is a data distribution policy that is determined based on the access policy and that is corresponding to the second link quality information and the flow description information of the service data flow.

The communications device 1100 may be a UPF, may be UE, or may be another device in a communications network. For all related content of the steps in the method embodiment corresponding to the second specific implementation, refer to a function description of corresponding function modules. Details are not described herein.

Figure 12:
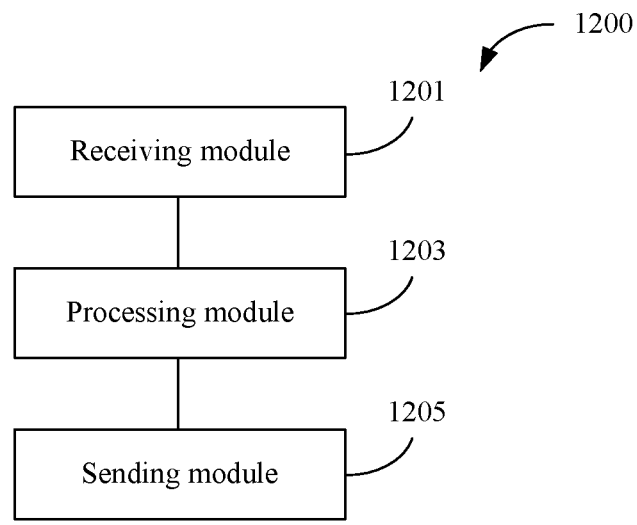
FIG. 12 is a schematic structural diagram of still another data distribution apparatus according to an embodiment of the present invention.

For another example, when function modules are obtained through division based on corresponding functions, FIG. 12 is a schematic structural diagram of a communications device in the method embodiment corresponding to FIG. 8.

The communications device 1200 includes a receiving module 1201, a processing module 1203, and a sending module 1205.

The receiving module 1201 is configured to receive a reporting rule from a session management function entity, where the reporting rule is used to instruct the communications device to report, when link quality of a link used for transmitting a service data flow of a first service type changes, updated link quality information (or second link quality information) of the link used for transmitting the service data flow. The receiving module 1201 is further configured to receive a service data flow of the first service type.

The processing module 1203 is configured to determine updated link quality information of a link used for transmitting the service data flow. The sending module 1205 is configured to send the updated link quality information to the session management function entity if the updated link quality information is different from reported link quality information of the link used for transmitting the service data flow. Correspondingly, the receiving module 1201 is configured to receive a data distribution policy from the session management function entity.

The processing module 1203 is further configured to distribute the service data on the link according to the data distribution policy. The data distribution policy is a data distribution policy that is determined based on an access policy and that is corresponding to the updated link quality information and flow description information of the service data flow; and the access policy includes flow description information of a data flow, quality information of at least two links, and a data distribution policy of the data flow on the links.

In a possible implementation, that the updated link quality information is different from reported link quality information of the link used for transmitting the service data flow may be specifically: an amount of a change between the updated link quality information and the reported link quality information of the link used for transmitting the service data flow exceeds a predetermined threshold.

The communications device 1200 may be a UPF, may be UE, or may be another device in a communications network. For all related content of the steps in the method embodiment corresponding to FIG. 8, refer to a function description of corresponding function modules. Details are not described herein.

In the embodiment shown in FIG. 10, FIG. 11, or FIG. 12, the communications device is presented in a form of performing division to obtain function modules based on corresponding functions, or the communications device is presented in a form of performing division to obtain function modules in an integrated manner. The "module" herein may mean an application-specific integrated circuit (ASIC), a processor that executes one or more software or firmware programs and a memory, an integrated logic circuit, and/or another component that can provide the foregoing functions. In a simple embodiment, a person skilled in the art may understand that the communications device 1000, the communications device 1100, and the communications device 1200 may use the form shown in FIG. 3. For example, the receiving module 1001 and the processing module 1003 in FIG. 10 may be implemented by using the processor 31 (and/or the processor 38) and the memory 33 in FIG. 3. Specifically, the receiving module 1001 and the processing module 1003 may be implemented by the processor 31 (and/or the processor 38) by invoking application program code stored in the memory 33. This is not limited in this embodiment of the present invention. The receiving module 1101, the processing module 1103, and the sending module 1105 in FIG. 11 may be implemented by using the processor 31 (and/or the processor 38) and the memory 33 in FIG. 3. Specifically, the receiving module 1101, the processing module 1103, and the sending module 1105 may be implemented by the processor 31 (and/or the processor 38) by invoking application program code stored in the memory 33. This is not limited in this embodiment of the present invention. The receiving module 1201, the processing module 1203, and the sending module 1205 in FIG. 12 may be implemented by using the processor 31 (and/or the processor 38) and the memory 33 in FIG. 3. Specifically, the receiving module 1201, the processing module 1203, and the sending module 1205 may be implemented by the processor 31 (and/or the processor 38) by invoking application program code stored in the memory 33. This is not limited in this embodiment of the present invention.

An embodiment of the present invention further provides a computer storage medium, configured to store a computer software instruction used by the communication device shown in FIG. 10, the communication device shown in FIG. 11, or the communication device shown in FIG. 12, and the computer software instruction includes a program designed for performing the foregoing method embodiment.

An embodiment of the present invention further provides a computer program product, configured to store a computer software instruction used by a communications device, and the computer software instruction includes a program designed for performing the foregoing method embodiment.

The terms "first", "second", "third" in the specification, claims and the foregoing accompanying drawings in the embodiments of this application are not intended to describe a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive solution, for example, a process, method, system, product, or device that includes a list of steps or units is not necessarily limited to those units, but may include other steps or units not expressly listed or inherent to such a process, method, system, product, or device.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a plurality of cases. A single processor or another unit may implement several functions enumerated in the claims. Some measures are recorded in dependent claims that are different from each other, but this does not mean that these measures cannot be combined to produce a better effect. A person skilled in the art should understand that the embodiments of this application may be provided as a method, an apparatus (device), or a computer program product. Therefore, this application may use a form of hardware only embodiments, software only embodiments, or embodiments with a combination of software and hardware. They are collectively referred to as "modules" or "systems". Moreover, this application may use a form of a computer program product that is implemented on one or more computer-usable storage media (including but not limited to a disk memory, a CD-ROM, an optical memory, and the like) that include computer usable program code. The computer program is stored/distributed in a proper medium and is provided as or used as a part of the hardware together with another hardware, or may also use another allocation form, such as by using the Internet or another wired or wireless telecommunications system.

The present invention is described with reference to the flowcharts and/or block diagrams of the method, the apparatus (device), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present invention is described with reference to specific features and the embodiments thereof, apparently, various modifications and combinations may be made to them without departing from the spirit and scope of the present invention. Correspondingly, the specification and accompanying drawings are merely an example description of the present invention defined by the accompanying claims, and is considered as any of or all modifications, variations, combinations or equivalents that cover the scope of the present invention. Apparently, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A data distribution method, comprising:
receiving, by a communications device, an access policy from a session management function entity, wherein the access policy comprises flow description information, quality information of at least two links, and a data distribution policy on the at least two links;

receiving, by the communications device, a service data flow; and in response to determining that the access policy comprises flow description information of the service data flow;

determining, by the communications device, link quality information of a link used for transmitting the service data flow; and distributing, by the communications device, the service data flow on the link according to the data distribution policy, wherein the data distribution policy is a data distribution policy that is determined based on the access policy and that is corresponding to the link quality information and the flow description information of the service data flow.

2. The method according to claim 1, wherein the data distribution policy comprises a data flow distribution ratio on the at least two links; and wherein distributing, by the communications device, the service data flow on the link according to the data distribution policy comprises sending, by the communications device and based on the data flow distribution ratio on the at least two links, service data on the link.

3. The method according to claim 2, wherein the data distribution policy further comprises a waiting latency for a receiving party to perform data reordering.

4. The method according to claim 2, wherein the data distribution policy further comprises a data sending sequence.

5. The method according to claim 2, wherein the service data further comprises a data packet sequence number, and wherein the data packet sequence number is used by a receiving party to reorder received service data.

6. The method according to claim 1, wherein the method further comprises receiving, by the communications device, an updated access policy from the session management function entity.

7. The method according to claim 1, wherein before the distributing, by the communications device, the service data flow on the link according to the data distribution policy, the method further comprises:

determining, by the communications device and based on the access policy, a data distribution policy corresponding to the link quality information and the flow description information of the service data flow.

8. A communications device, comprising:

at least one processor; and a non-transitory computer-readable storage medium coupled to the at least one processor and storing programming instructions for execution by the at least one processor, the programming instructions instruct the at least one processor to:

receive an access policy from a session management function entity, wherein the access policy comprises flow description information, quality information of at least two links, and a data distribution policy on the at least two links;

receive a service data flow; and in response to determining that the access policy comprises flow description information of the service data flow:

determine link quality information of a link used for transmitting the service data flow; and distribute the service data flow on the link according to the data distribution policy, wherein the data distribution policy is a data distribution policy that is determined based on the access policy and that is corresponding to the link quality information and the flow description information of the service data flow.

9. The communications device according to claim 8, wherein the programming instructions instruct the at least one processor to:

send, based on a data flow distribution ratio on the at least two links, service data on the link.

10. The communications device according to claim 9, wherein the data distribution policy further comprises a waiting latency for a receiving party to perform data reordering.

11. The communications device according to claim 8, wherein the programming instructions instruct the at least one processor to:

receive an updated access policy from the session management function entity.

12. The communications device according to claim 8, wherein the programming instructions instruct the at least one processor to:

determine, based on the access policy, a data distribution policy corresponding to the link quality information and the flow description information of the service data flow.

13. The communications device according to claim 8, wherein the communications device is a user plane function entity or user equipment.

14. A data distribution system, comprising:

a communications device; and a session management function entity, wherein the session management function entity is configured to send an access policy to the communication device; and wherein the communications device is configured to:

receive the access policy, wherein the access policy comprises flow description information, quality information of at least two links, and a data distribution policy on the at least two links;

receive a service data flow; and in response to determining that the access policy comprises flow description information of the service data flow:

determine link quality information of a link used for transmitting the service data flow; and distribute the service data flow on the link according to the data distribution policy, wherein the data distribution policy is a data distribution policy that is determined based on the access policy and that is corresponding to the link quality information and the flow description information of the service data flow.

15. The data distribution system according to claim 14, wherein the data distribution policy comprises a data flow distribution ratio on the at least two links, and wherein the communications device is configured to:

send, based on the data flow distribution ratio on the at least two links, service data on the link.

16. The data distribution system according to claim 15, wherein the data distribution policy further comprises a waiting latency for a receiving party to perform data reordering.

17. The data distribution system according to claim 15, wherein the data distribution policy further comprises a data sending sequence.

18. The data distribution system according to claim 15, wherein the service data further comprises a data packet sequence number, and wherein the data packet sequence number is used by a receiving party to reorder received service data.

19. The data distribution system according to claim 14, wherein the communications device is configured to:
  receive an updated access policy from the session management function entity.

20. The data distribution system according to claim 14, wherein the communications device is configured to:
  determine, based on the access policy, a data distribution policy corresponding to the link quality information and the flow description information of the service data flow.

* * * * *